(12) United States Patent
Haber

(10) Patent No.: US 7,564,798 B2
(45) Date of Patent: Jul. 21, 2009

(54) METHODS AND DEVICES FOR TESTING AND MONITORING HIGH SPEED COMMUNICATION NETWORKS

(75) Inventor: Sara Haber, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 870 days.

(21) Appl. No.: 10/926,422

(22) Filed: Aug. 25, 2004

(65) Prior Publication Data

US 2005/0086336 A1 Apr. 21, 2005

Related U.S. Application Data

(60) Provisional application No. 60/498,159, filed on Aug. 27, 2003.

(51) Int. Cl.
*G06F 11/00* (2006.01)
(52) U.S. Cl. ............................. 370/252; 714/1; 710/19
(58) Field of Classification Search ................. 370/216, 370/229, 241–253; 714/100, 1, 2, 25, 27, 714/28, 57; 710/15–19; 702/108, 117, 118, 702/121
See application file for complete search history.

(56) References Cited

U.S. PATENT DOCUMENTS

| 4,057,847 | A | * | 11/1977 | Lowell et al. ............... 702/122 |
| 4,192,451 | A | * | 3/1980 | Swerling et al. ............ 714/732 |
| 5,357,519 | A | * | 10/1994 | Martin et al. ................ 714/25 |
| 5,659,680 | A | * | 8/1997 | Cunningham et al. ......... 714/25 |
| 6,584,432 | B1 | * | 6/2003 | Holzinger et al. ........... 702/188 |
| 6,625,648 | B1 | * | 9/2003 | Schwaller et al. ........... 709/224 |
| 6,879,812 | B2 | * | 4/2005 | Agrawal et al. .......... 455/67.11 |
| 7,231,558 | B2 | * | 6/2007 | Gentieu et al. .............. 714/704 |

* cited by examiner

*Primary Examiner*—Aung S Moe
*Assistant Examiner*—Kerri M Rose
(74) *Attorney, Agent, or Firm*—Workman Nydegger

(57) ABSTRACT

Devices and methods are disclosed for use in testing and evaluating aspects of a high speed communications network. In particular, a portable traffic checker for field use is provided that includes multiple sets of different types of communication links and is compatible with multiple protocols. One such traffic checker includes "test" and "monitor" modules having access to a data signal received by the traffic checker. The "test" module tests aspects of the communications network with a BER methodology, while the "monitor" module checks and reports on aspects of the data signal such as frame sizes, data rates, and data signal errors. Information obtained by the modules can be timestamped and stored in a log, and may also be uploaded through a communications port. Some information may also be displayed. Additionally, the traffic checker is switchable between the "test" and "monitor" modes and enables a user to select a data rate.

34 Claims, 5 Drawing Sheets

METHODS AND DEVICES FOR TESTING AND MONITORING HIGH SPEED COMMUNICATION NETWORKS

RELATED APPLICATIONS

This application claims the benefit of U.S. Provisional Patent Application Ser. No. 60/498,159, entitled METHODS AND DEVICES FOR TESTING AND MONITORING TRAFFIC IN HIGH SPEED DATA SYSTEMS, filed Aug. 27, 2003, and incorporated herein in its entirety by this reference.

BACKGROUND OF THE INVENTION

1. Field of the Invention

The present invention relates generally to systems, methods and devices for evaluation of various aspects of network traffic and network systems and devices. More particularly, embodiments of the present invention concern systems, methods and devices for monitoring and evaluating various aspects of network systems and associated traffic, as well as for testing and evaluating various aspects of the network system.

2. Related Technology

Computer and data communications networks continue to proliferate due to declining costs, increasing performance of computer and networking equipment, and increasing demand for communication bandwidth. Communications networks—including wide area networks ("WANs") and local area networks ("LANs"), Metropolitan area networks ("MAN"), and storage area networks ("SANs") allow increased productivity and utilization of distributed computers or stations through the sharing of resources, the transfer of voice and data, and the processing of voice, data and related information at the most efficient locations.

Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion in the number of installed networks.

As the demand for networks has grown, network technology has developed to the point that many different physical configurations presently exist. Examples include Gigabit Ethernet ("GE"), 10 GE (also sometimes referred to as "XGig"), Fiber Distributed Data Interface ("FDDI"), Fibre Channel ("FC"), Synchronous Optical Network ("SONET") and InfiniBand networks. These networks, and others, typically conform to one of a variety of established standards, or protocols, which set forth rules that govern network access as well as communications between and among the network resources. Typically, such networks utilize different cabling systems and hardware, have different characteristic bandwidths, and transmit data at different speeds, or rates. Network bandwidth, in particular, has been the driving consideration behind many advancements in the area of high speed communication systems, methods and devices.

For example, the ever-increasing demand for network bandwidth has resulted in the development of technology that increases the amount of data that can be pushed through a single channel on a network. Advancements in modulation techniques, coding algorithms and error correction have vastly increased the rates at which data can be transmitted across networks. For example, it was the case at one time that the highest rate that data could travel across a network was at about one Gigabit per second. That rate subsequently increased to the point where data could travel across Ethernet and SONET networks at rates as high as 10 gigabits per second, or faster.

As communication networks have increased in size, speed and complexity however, they have become increasingly likely to develop a variety of problems that, in practice, have proven difficult to diagnose and resolve. Such problems are of particular concern in light of the continuing demands for high levels of network operational reliability and for increased network capacity.

The problems experienced in network communication systems can take a variety of forms and may occur as a result of a variety of different circumstances. Examples of circumstances, conditions and events that may give rise to network communication problems include word errors, data and frame errors, improper network configuration and superfluous network traffic, loss of link, corruption of network traffic by network systems and devices, loss of data signal, and loss of synchronization, to name just a few.

Such problems are aggravated by the fact that networks are continually changing and evolving due to growth, reconfiguration and introduction of new network typologies and protocols. Moreover, new network interconnection devices and software applications are constantly being introduced and implemented. Circumstances such as these highlight the need for effective, reliable and flexible diagnostic and remedial systems, methods and devices.

Consequently, as high speed data communications systems, processes and devices mature, many designs have increasingly focused on reliability and performance issues. One area of interest concerns the monitoring of network traffic, as well as the performance of associated network devices. Another area of interest concerns the testing of network systems and devices.

In view of the foregoing, it would be useful to provide a traffic checker suitable for use in monitoring various hardware and protocol-specific parameters. The traffic checker should also monitor network traffic density, and report on any low level errors. Further, the traffic checker should be able to perform various testing evolutions that can be used to evaluate aspects such as the performance and integrity of network components. Finally, the traffic checker should be sufficiently rugged and reliable to be suitable for field use.

BRIEF SUMMARY OF AN EXEMPLARY EMBODIMENT OF THE INVENTION

Exemplary embodiments of the invention are generally concerned with systems, methods and devices for monitoring, testing and evaluating various aspects of network systems and associated traffic. In one exemplary embodiment, a multi-protocol traffic checker is provided that includes a housing containing a monitor module, and a test module, each of which is configured to implement particular functionalities with regard to network systems and components, and associated data streams, or signals. Exemplarily, the traffic checker is a portable device that includes a rechargeable battery.

The monitor module includes a plurality of link connections, each of which enables the monitor module to receive, and retransmit, a signal associated with a particular type of system and protocol. A retimer, or receiver and clock recovery, is configured to receive and process the data signal before retransmission. The exemplary traffic checker also includes a communication port that enables the monitor module to provide information to, and/or receive information from, an external device, such as a host device. Further, the monitor module of the traffic checker includes various functional submodules that implement particular functions with respect to the signal received by the traffic checker, and which are configured and arranged to communicate with a display. An error check submodule taps the signal and communicates with the display, as well as with a log.

The test module of the traffic checker includes a transmitter in communication with a pattern memory that, in turn, communicates with a compare engine. A log is also included that receives timestamp information, as well as information from a BER calculator that communicates with the compare engine. The log is configured to communicate with a remote device by way of a comm port. As well, the BER calculator is configured to provide input to a display.

In the 'monitor' mode, the signal is received by the monitor module and error checks, frame size checks, data rate checks and/or other checks concerning the signal are performed by the various respective functional submodules. Some or all of the information gathered is then displayed, and any errors detected are filed in the log. In the 'test' mode, the transmitter accesses the pattern memory and transmits a pattern to a desired network node. When the pattern returns to the traffic checker, the compare engine evaluates the received pattern relative to the initially transmitted pattern and sends error information to the BER calculator. The BER calculator determines a BER which is then sent to the display and the log. The BER and a timestamp are correlated in the log and the correlated information is transmitted to a remote device by way of the comm port.

In this way, the exemplary traffic checker is able to both passively and actively evaluate various aspects of the operation and performance of communication network systems and devices. Further, this functionality is implemented in a single, multi-protocol device that is suitable for use in the field.

BRIEF DESCRIPTION OF THE DRAWINGS

In order that the manner in which the above-recited and other aspects of the invention are obtained, a more particular description of the invention briefly described above will be rendered by reference to specific embodiments thereof which are illustrated in the appended drawings. Understanding that these drawings depict only exemplary embodiments of the invention and are not therefore to be considered limiting of its scope, the invention will be described and explained with additional specificity and detail through the use of the accompanying drawings in which.

DETAILED DESCRIPTION OF EXEMPLARY EMBODIMENTS

In general, embodiments of the invention are concerned with a traffic checker for use in connection with testing and monitoring various aspects of network systems, devices and traffic. Note that while reference is made herein to a 'traffic checker,' embodiments of the invention are not, as disclosed herein, limited solely to performing traffic check functions. Exemplary embodiments of the traffic checker include a test module and a monitor module. The test module enables the traffic checker to implement on-demand, real time testing of the network, while the monitor module enables the traffic checker to passively assess the state of the network.

Embodiments of the invention are particularly well suited for use in connection with metropolitan area networks ("MAN"), but may be used with various other types of networks and systems as well. The traffic checker may be configured for use with various protocols, and both low and high line rates. Examples of such protocols include, but are not limited to, Fibre Channel and Gigabit Ethernet protocols. Examples of supported line rates include 1, 2 and 10 gigabits/second, or higher, as well as low speed rates such as 100 mbs and 200 mbs. Exemplarily, the traffic checker is configured so that multiple protocols, as well as a number of different data rates, are supported within a single device with no, or minimal, modification or reconfiguration.

As disclosed in further detail herein, exemplary embodiments of the traffic checker take various configurations, for example, a portable, hand-held device suitable for field use, and employable in a variety of different arrangements. Embodiments of the traffic checker are configured for use with various communication media that include, but are not limited to, copper and/or optical links, and various combinations thereof. Some implementations of the traffic checker employ Gigabit Interface Converter ("GBIC") modules, while others employ small form factor pluggables ("SFFP").

I. General Aspects of An Exemplary Traffic Checker

Figure 1:
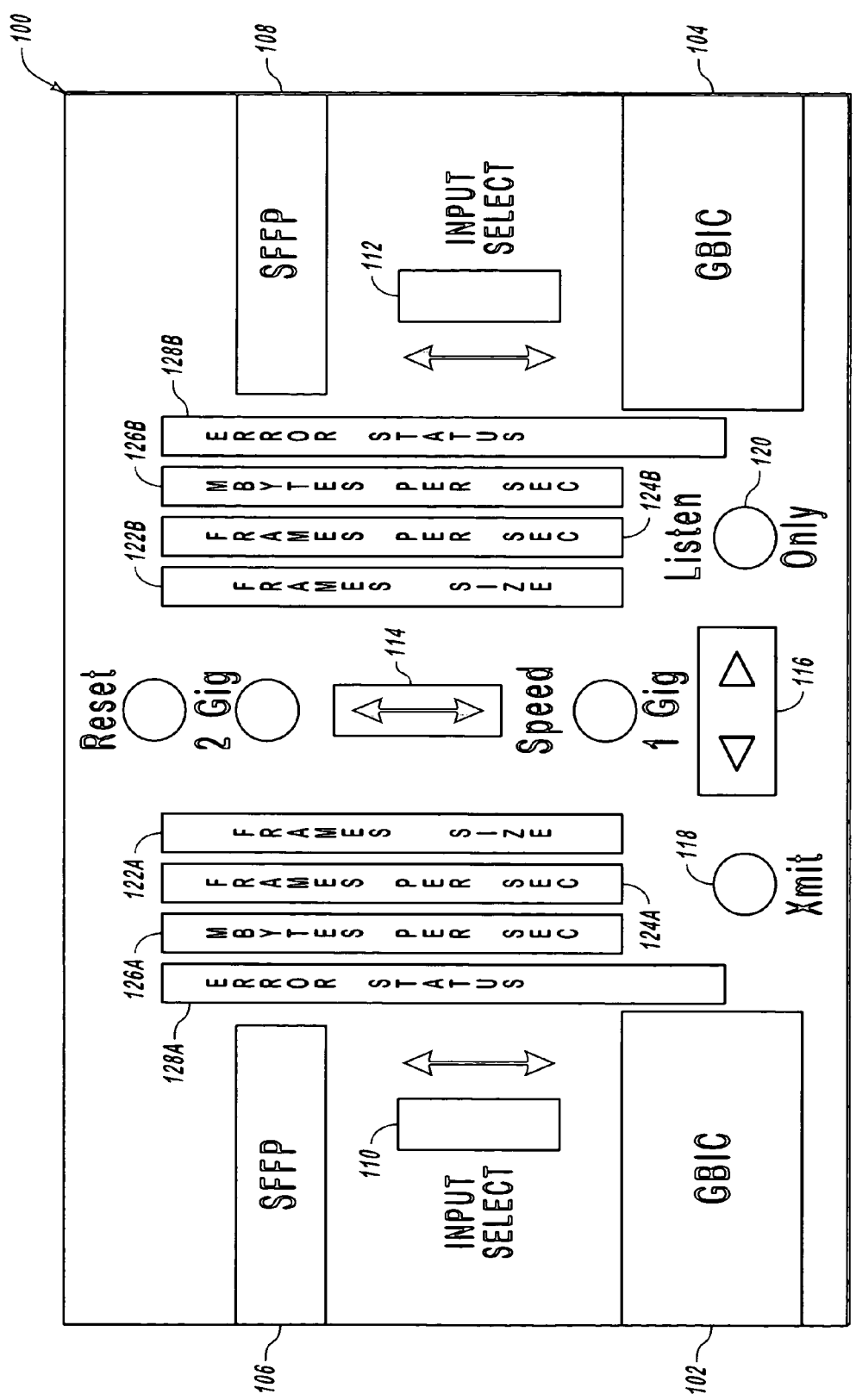
FIG. 1 is schematic drawing of an exemplary implementation of a traffic checker.

With attention now to FIG. 1, details are provided concerning an exemplary traffic checker, denoted generally at 100. Embodiments of the traffic checker 100 include a number of different link connections which are generally configured to enable the traffic checker 100 to communicate with systems corresponding to any of a variety of different protocols.

Thus, exemplary embodiments of the traffic checker 100 are configured to support multiple protocols and, moreover, are adaptable to support additional or alternative protocols as well. Examples of protocols and standards in connection with which embodiments of the traffic checker are adapted to operate, include, but are not limited to, protocols such as Gigabit Ethernet, 10 Gigabit Ethernet (sometimes referred to as "XGig"), Fibre Channel ("FC"), Fiber Connector ("FICON"), inter system coupling ("ISC") interface, synchronous optical network ("SONET"), OC48 (corresponding to a SONET transmission rate of 2488.32 mb/s), and slower protocols such as the 200 mb/s ESCON.

In the illustrated embodiment, the traffic checker 100 includes link connections implemented as a pair of GigaBit Interface Converter ("GBIC") bays 102 and 104 which enable connection of the traffic checker 100 to fiber-based transmission systems such as Fibre Channel ("FC") and Gigabit Ethernet ("GigE"), as well as a pair of small form factor pluggable ("SFFP") connections 106 and 108. Each pair of link connections includes one link connection that receives a signal and one link connection by way of which the received signal is transmitted, so that a full-duplex arrangement is implemented. In at least some implementations, each link connection is configured to accommodate multiple channels.

Note that the illustrated combination of link connections is exemplary only, and various alternative combinations may be employed in embodiments of the traffic checker so that the traffic checker can connect and communicate with a variety of combinations of wire-based, and/or optical fiber-based, systems and devices. Of course, the traffic checker may also be implemented in a protocol-specific form with only a single pair of link connections.

Another embodiment of the traffic checker includes, among other things, one or more low speed link connections that enable the traffic checker to interface with systems and devices conforming to relatively lower frequency protocols. One such link connection is an enterprise systems connection ("ESCON") such as is commonly employed in large campus and metropolitan area networks. This, and/or other, embodiments of the traffic checker include one or more Subscriber Connector ("SC") connections, as well as one or more low speed links, such as a 100 mb/s connection for example.

Consistent with the multi-protocol compatibility of the traffic checker 100, a pair of input selector switches, denoted at 110 and 112, are provided so that the traffic checker 100 can be set to operate in connection with either the SFFP or GBIC link connections 102/104 and 106/108, respectively. In this way, an operator can simply toggle the input selector switches 110 and 112 according to the particular system with which the traffic checker 100 is to be employed. Other embodiments of the traffic checker include input selector switches, or comparable devices, that permit a user to select from among two or more different types of link connections.

Not only are embodiments of the traffic checker flexible in terms of the different protocols with which they may be used, but exemplary embodiments of the traffic checker are also configured to operate in connection with a variety of different line rates. To this end, the illustrated traffic checker 100 includes a line rate, or "speed," selector switch 114 that permits a user to select the line rate with which the traffic checker monitor and/or test functions will be utilized. In the illustrated embodiment, the traffic checker 100 includes a line rate selector switch 114 that can be toggled between 1 Gb/s and 2 Gb/s line rates, depending upon the situation. Other implementations of the traffic checker include line rate selector switches, or comparable devices, that permit a user to select from among two or more different line rates.

With continuing reference to FIG. 1, the exemplary traffic checker 100 is configured, as suggested earlier, with both a "test" mode and a "monitor" mode. Accordingly, the traffic checker 100 includes a mode selector switch 116 which allows the user to select a mode of operation for the traffic checker 100. In the "test" mode, and as disclosed in further detail elsewhere herein, the traffic checker 100 transmits a test pattern over a desired system or device and then analyzes the returning pattern. Thus, the traffic checker 100 includes a test mode indicator "Xmit" 118 that, when lit, indicates that the traffic checker 100 is operating in the "test" mode.

On the other hand, when the traffic checker 100 is in the "monitor" mode, the test mode indicator "Xmit" 118 is extinguished, and a "monitor" mode indicator "Listen Only" 120 is lit. As suggested above, the "monitor" mode indicator "Listen Only" 120 is extinguished when the test mode indicator "Xmit" 118 is lit. Thus, a user can tell at a glance the mode in which the traffic checker 100 is operating, and can readily change the mode, if desired, by way of the mode selector switch 116.

It should be noted that the use of the "monitor" mode and "test" mode terminology herein is for the purpose of distinguishing between two exemplary modes of operation of the traffic checker 100. However, the use of the "monitor" and "test" designations herein is not intended to limit the scope of functionalities associated with these, and/or other, modes that may be embodied and employed by implementations of the traffic checker. For example, in some embodiments, one or more functionalities may be common to both the "monitor" and the "test" modes.

Consistent with the exemplary functionalities disclosed herein, the traffic checker 100 illustrated in FIG. 1 includes various visual displays or readouts which provide the user with information concerning operations performed by the traffic checker 100. The exemplary traffic checker 100 includes a pair of visual displays for each data channel.

Thus, the traffic checker 100 includes a frame size indicator 122A for channel 1 (122B for channel 2) that displays the size of a particular frame, or frames received and/or transmitted on that channel. Additionally, the traffic checker 100 includes a frame rate indicator 124A for channel 1 (124B for channel 2) that displays the number of frames received or transmitted, as applicable, each second. The traffic checker 100 further includes a data or line rate indicator 126A for channel 1 (126B for channel 2) that displays the actual data rate through the traffic checker 100.

In addition to the aforementioned controls, the exemplary traffic checker 100 also includes a reset control 127. The reset control 127 allows the user to reboot the traffic checker 100 in the event that the traffic checker is operating improperly or becomes unstable.

Finally, the illustrated embodiment of the traffic checker 100 includes various error status indicators 128A for channel 1 (128B for channel 2) that provides information concerning various predefined error conditions. In some implementations of the traffic checker 100, the error status indicators take the form of light emitting diodes ("LED") that are configured to display different colors, each of which corresponds to a particular state or condition. An extinguished indicator also conveys certain information relating to the system or device being monitored or tested by the traffic checker 100. One exemplary traffic checker 100 is configured to display the status information indicated in the following table.

| ERROR STATUS INDICATOR | OFF | RED | YELLOW | GREEN |
|---|---|---|---|---|
| FRAMES | NO SOF | BAD FRAME | PREVIOUS BAD FRAME | ONLY GOOD FRAMES |
| WORDS | NO SYNC | CODE VIOLATION | PREVIOUS CODE VIOLATION | ONLY GOOD CODE |
| IN SYNC | NO SIGNAL | LOSS OF SYNC | PREVIOUS LOSS OF SYNC | NEVER LOSS OF SYNC |
| LINK RESET | NO SIGNAL | LR, LRR OR LIP | PREVIOUS LR, LRR OR LIP | NEVER RESET |
| LINK ONLINE | NO SIGNAL | NOS OR LOS | PREVIOUS NOS OR LOS | NEVER OFF LINE |
| RCVD SIGNAL | NO GBIC | LOSS OF SIGNAL | PREVIOUS LOST SIGNAL ONCE | GOOD SIGNAL |

It should be noted that the foregoing table is but one example of an error status indicator configuration that may be implemented within a traffic checker. Various alternative error status configurations may alternatively be employed, consistent with the requirements of particular protocols, test and monitor setups, network and network device configurations and arrangements, and any other relevant considerations. Accordingly, the scope of the invention is not limited solely to the disclosed error status indicator configurations. Further details concerning various exemplary functions implemented in connection with the "monitor" and "test" modes of the traffic checker 100 are provided elsewhere herein in connection with the disclosure concerning exemplary "monitor" and "test" modules of the traffic checker.

II. Configuration of Exemplary Monitor and Test Modules

As disclosed earlier herein, exemplary embodiments of the traffic checker are configured to operate in two different modes, specifically, a "monitor" mode and a "test" mode, each of which embraces, in exemplary embodiments, particular functions or groups of functions. In general, an exemplary "monitor" mode involves a relatively passive approach to analysis of a network and associated systems and devices where the traffic checker simply collects and processes data and information concerning the network and associated systems and devices. On the other hand, an exemplary "test" mode involves performance of self-initiated test procedures where, for example, test data patterns are transmitted onto the network and the returning data patterns evaluated.

In order to implement the exemplary "monitor" and "test" functionalities, exemplary embodiments of the traffic checker include a "monitor" module and a "test" module, respectively. It should be noted that the aforementioned components are separated into two figures, as discussed below, solely to facilitate clarity and discussion and, accordingly, such separation does not limit the scope of the invention. Moreover, the monitor module and test module may share one or more components, depending upon the particular embodiment of the traffic checker. With attention now to FIGS. 2 and 3, and with continuing attention to FIG. 1, details are provided concerning exemplary implementations of such monitor and test modules.

A. Traffic Checker Monitor Module

Figure 2:
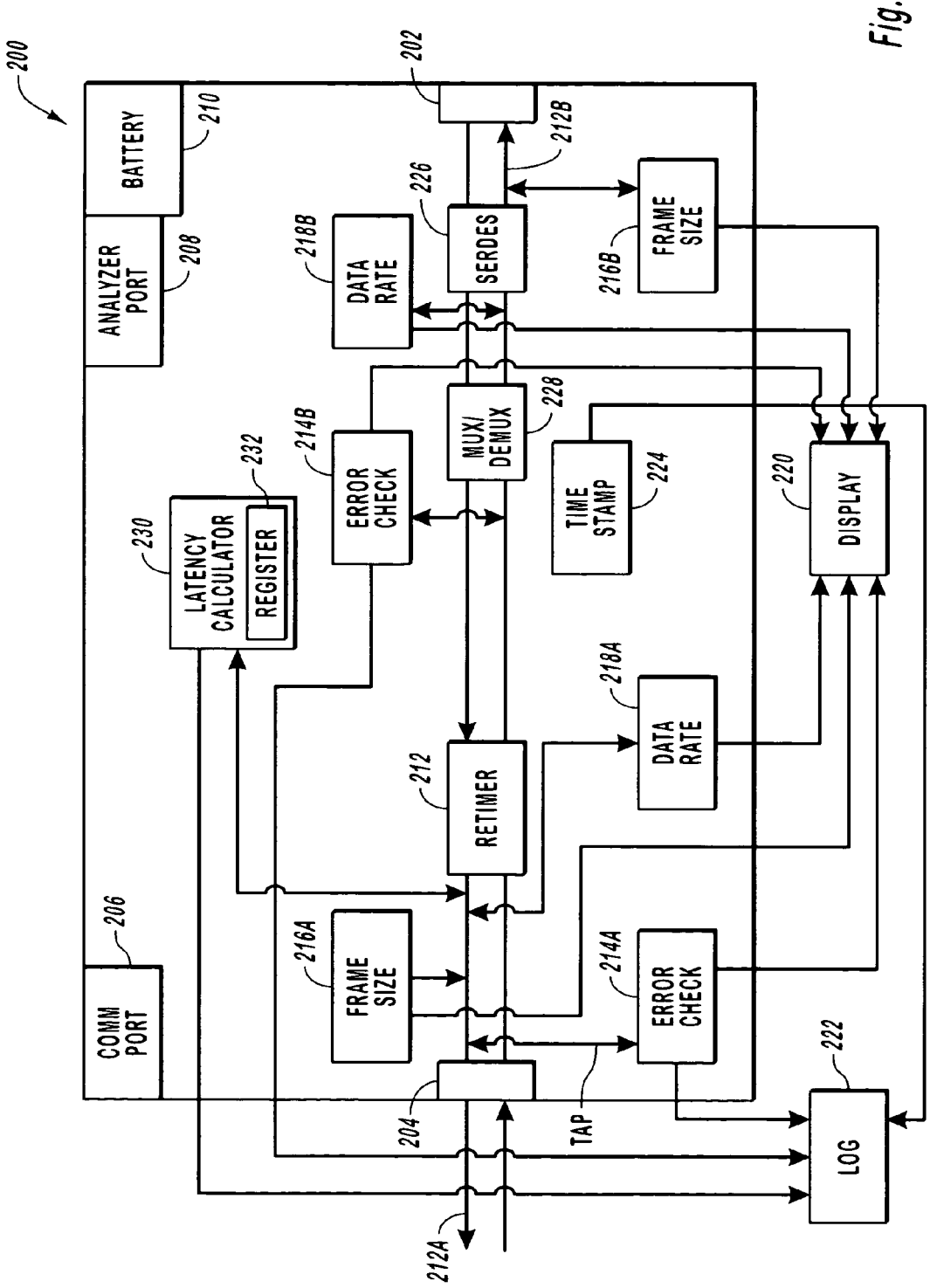
FIG. 2 is a schematic drawing of a monitor module employed in an exemplary traffic checker.

With attention first to FIG. 2, and with continuing attention to FIG. 1, an exemplary monitor module is denoted generally at 200. Among other things, the monitor module 200 is configured to monitor and report on a wide range of hardware status parameters, protocol level error conditions and performance measures, and continuously monitors both directions of a duplex link.

More particularly, exemplary embodiments of the monitor module 200 provide real time error detection and indication for conditions which include, but are not limited to, error indicators for initialization primitives, Code Violations (where, in an 8 B:10 B coding arrangement, the actual bits are in the wrong formation), cyclical redundancy check ("CRC") errors, Loss of Synchronization ("Sync") and Loss of Signal ("LOS"). Exemplarily, the aforementioned errors are each supported by a corresponding error counter, 'time of day' timestamp, and a log which serves to store error count and timestamp information.

Further, some exemplary implementations of the traffic checker provide for various real time functionalities concerning a data stream. For example, at least some embodiments of the monitor module 200 implement real time data rate and packet size indication, as well as real time logging, with timestamp, of the data rate and packet size information. In one exemplary embodiment, the monitor module 200 measures link traffic in Mbytes and Kframes per second (see FIG. 1) and also reports frame payload size mix. This exemplary embodiment of the monitor module 200 also captures any link errors for subsequent analysis and other operations.

With more particular attention now to FIG. 2, the exemplary monitor module 200 includes a pair of link connections 202 and 204 configured for full-duplex operation and arranged to receive, and pass, various data signals. Typically, the link connections 202 and 204 are arranged in a tap configuration with respect to a network data signal so that, notwithstanding any error or failure at the traffic checker, the data signal will not be impaired in any way. Further details concerning exemplary arrangements involving implementation of a traffic checker in conjunction with a network are disclosed elsewhere herein.

The link connections 202 and 204 may simply be the link connections of the traffic checker 100 (see FIG. 1) or, alternatively, may comprise link connections separate from, but in communication with, the link connections of the traffic checker 100. As the discussion of the link connections illustrated in FIG. 1 is substantially germane to link connections 202 and 204 illustrated in FIG. 2, further discussion herein of link connections 202 and 204 will be directed primarily to certain selected aspects of the link connections 202 and 204.

The exemplary monitor module 200 also includes various other elements which facilitate communications with other systems and devices. For example, the monitor module 200 includes a communication or "comm" port 206 that enables the monitor module 200 to communicate information to a remote device, such as a PC, for further evaluation and analysis. The comm port 206 may be configured in any fashion necessary to enable such communication and, more particularly, the comm port 206 is configured for compatibility with the remote device with which the monitor module 200 is intended to communicate. Communications involving the monitor module 200 are also implemented by way of an analyzer port 208. Generally, the analyzer port 208 enables the monitor module 200 to communicate data and information with other diagnostic, testing, and analyzing devices.

In addition to including various ports, exemplary embodiments of the monitor module 200 also include a rechargeable battery 210. Among other things, the battery 210 makes the traffic checker 100 well suited for use in the field, where reliable sources of electricity may be unavailable. The test module, discussed in further detail elsewhere herein, may include its own battery, or may obtain power from the battery 210. In the event that the traffic checker is not intended for field use, and electricity is readily available, the battery 210 may be omitted.

With continuing reference to FIG. 2, the monitor module 200 further includes circuitry to receive the data stream by way of the link connections 202 and 204, so that the data stream can be effectively monitored by the traffic checker. Specifically, the illustrated embodiment includes a retimer 212, or retiming circuitry, that retimes the data if the monitor module 200 determines that the incoming data is out of sync with a reference clock. Thus, the output of the retimer 212 is a retimed data stream or signal that is synchronized with the reference clock. In exemplary embodiments of the monitor module 200, both the untimed and retimed data signals are evaluated.

More particularly, the monitor module 200 includes a variety of different submodules that access and evaluate untimed, or retimed, data. Such submodules may be generally referred to individually herein as a monitor submodule, and groups of such submodules may be generally referred to as monitor submodules. Among other things, such submodules receive link data, report data rates, and check for physical and packet/ frame level errors. Typically, the submodules are configured with suitable registers to aid in tracking and managing the collected information.

In the illustrated embodiment, the exemplary monitor module 200 includes a pair of error check submodules 214A and 214B configured and arranged to tap retimed data signals 212A and 212B, respectively. As disclosed elsewhere herein, error check submodules such as the exemplary error check submodules 214A and 214B are configured and arranged to check for errors such as initialization primitives, Code Violations, CRC errors, Sync errors and LOS. One or both of the error check submodules may be configured to check for additional or alternative errors as well. Further, more, or fewer, error check submodules may be employed, consistent with the requirements of a particular application.

In addition to the error check submodules 214A and 214B, the monitor module 200 also includes a pair of frame size submodules 216A and 216B configured and arranged to tap retimed data signals 212A and 212B, respectively. While denoted as "frame size" modules for convenience sake, such submodules 216A and 216B are not so limited in terms of their functionality. Rather, the frame size submodules 216A and are configured and arranged to report on frame payload size mix, as well as packet size, among other things.

The monitor module 200 further includes a pair of data rate submodules 218A and 218B configured and arranged to tap retimed data signals 212A and 212B, respectively. Among other things, the data rate submodules 218A and 218B serve to measure link traffic, also expressed herein as the data rate or line rate. In this exemplary implementation, the link traffic is measured in terms of both Mbytes and Kframes per second. Of course, the link traffic may be measured in any other suitable terms as well.

As indicated in FIG. 2, some or all of the various diagnostic or analytical modules, exemplified by error check submodules 214A and 214B, frame size submodules 216A and 216B, and data rate submodules 218A and 218B, are connected with a display 220 included as part of the traffic checker. In this way, information obtained by the various modules of the monitor module 200 can be displayed and made readily available to a user. Additional, or alternative, components may likewise be connected with the display 220. In at least some implementations, information and data concerning the test module, discussed below, is also provided to the display 220.

Information and data gathered and generated by the monitor module 200 is not only displayed however. In particular, a log 222 of the traffic checker is configured and arranged to enable the capture of various error check information and data obtained in connection with the operation of the error check submodules 214A and 214B. Further, a timestamp submodule 224 in communication with the log 222 enables events identified by the error check submodules 214A and 214B to be correlated with a particular time value, and the correlated event and time value pair stored in the log.

In this way, the time(s) at which one or more events occurred can be readily determined. More particularly, the error check information, along with corresponding real time, or time of day, timestamp information, that is downloaded to the log 222 may be used for further analysis and/or as an aid in identifying and implementing appropriate remedial actions concerning the system or device under test. For example, such information is particularly useful in identifying and describing causal relationships between particular events, or eliminating one or more particular events as a cause of another event, or events.

Note that although the illustrated embodiment of the monitor module 200 suggests that only the error check submodules 214A and 214B communicate with the log 222, the scope of the invention is not so limited. Rather, any other information or data that is desired to be collected, logged and timestamped may be communicated by various submodules to the log 222. Moreover, and as suggested by the foregoing, information other than error check information, such as frame size and data rate information for example, may be timestamped and logged as well. More generally then, any information and data collected by, and/or generated by, one or more monitor submodules of the monitor module 200 may be logged and timestamped as desired.

In addition to the foregoing, at least some embodiments of the monitor module 200 further include components suitable for serialization, multiplexing, deserialization and demultiplexing of data streams so as to facilitate analysis and evaluation of the data stream in connection with which the traffic checker is employed. In the illustrated embodiment, a serializer/deserializer ("SERDES") 226 and multiplexer/demultiplexer ("MUX/DEMUX") 228 are provided for implementing such functionality. The illustrated arrangement is exemplary only, and the SERDES 226 and/or MUX/DEMUX 228 may additionally, or alternatively, be provided on the other side of the retimer 212. Moreover, the serializing and deserializing may be performed within a single device, such as the SERDES 226 for example, or may be performed by respective devices. The same is generally true with respect to the multiplexing and demultiplexing processes.

Finally, exemplary embodiments of the monitor module 200 include a latency calculator 230 and associated register 232 which are configured to measure the latency of a system or portion thereof, device or component. Because of the value assigned by customers and the industry to accurate and reliable high speed data transmission, such latency measurements are particularly useful in the design, testing, installation and maintenance of high speed communication networks.

Typically, the measurement of latency with the monitor module 200 involves transmission, from the monitor module 200, of frames or other data packets onto the network and measuring the amount of time required for such frames to return to the monitor module 200. However, in some implementations of the traffic checker, the test module, rather than the monitor module, performs the latency measurements and, to that end, includes a latency calculator and corresponding register.

In the illustrated implementation, the latency calculator 230 includes a register 232 that contains an offset value reflecting the amount of time required for a frame to transit the traffic checker and other hardware not part of the system under test. After the monitor module 200 has determined the raw latency value, the offset value is then deducted from that raw latency value, by the latency calculator 230, to determine the actual latency of the system or device under test.

As indicated in FIG. 2, the latency calculator 230 communicates with the log 222 so that latency measurements can be correlated with a corresponding timestamp. By correlating the latency measurements in this way, changes in the latency of the network, or other system or device, over time can be determined. Such changes, in turn, can provide valuable insight into the operation and performance of the network.

B. Traffic Checker Test Module

Figure 3:
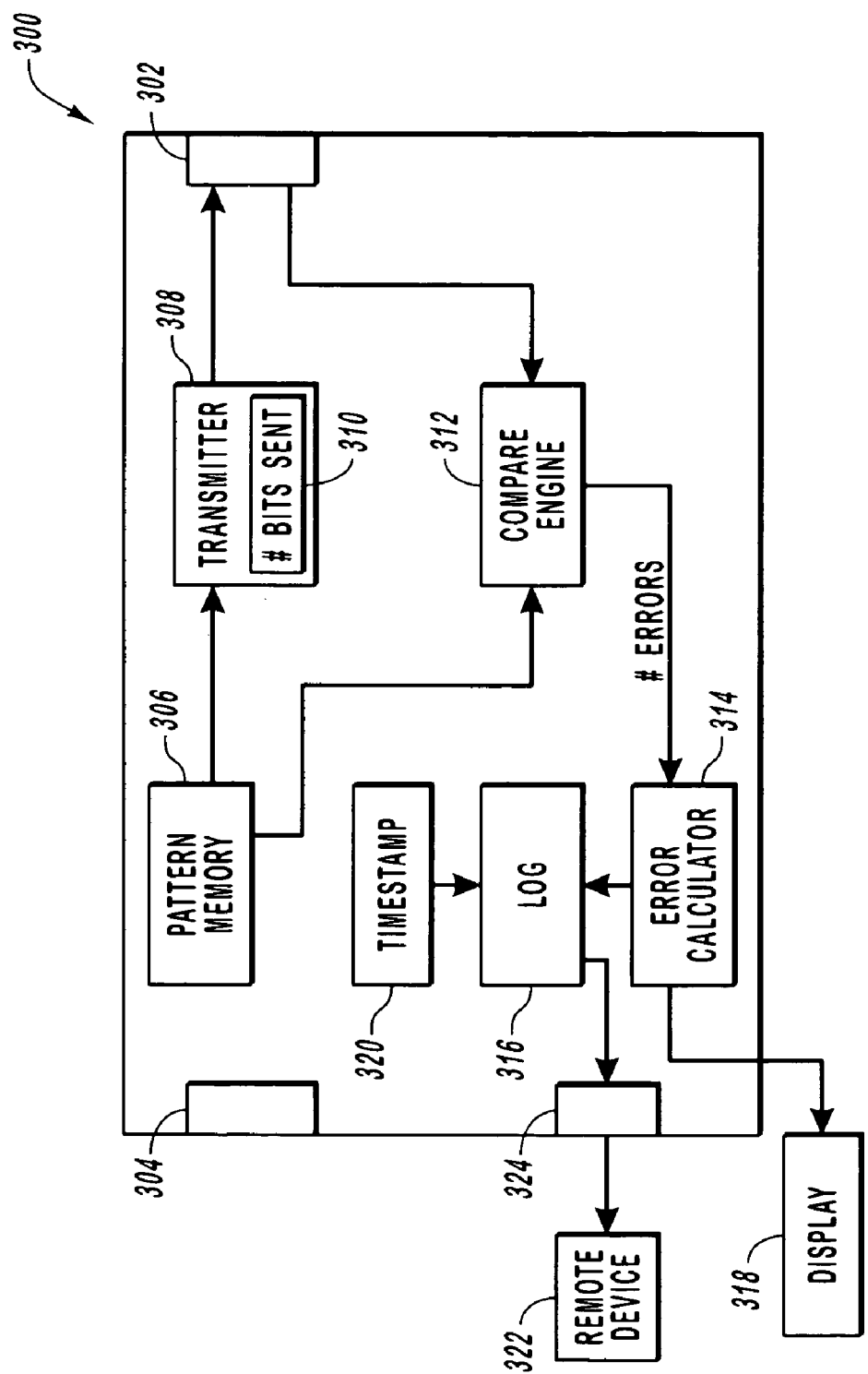
FIG. 3 is a schematic drawing of a test module employed in an exemplary traffic checker.

Directing attention now to FIG. 3, and with continuing attention to FIG. 1, an exemplary test module is denoted generally at 300. Among other things, the test module 300 is configured to implement error rate testing on networks or selected portions of networks, and related systems and devices. As disclosed herein, such testing is implemented, for example, using a bit error rate testing methodology, though the scope of the invention is not limited to such tests, nor to testing at the bit level. The testing functionality of the test module 300 enables the traffic checker to check the integrity and functionality of components and systems, such as, but not limited to, GBICs, cables, extended links, or an entire transport system. The determination of one or more bit error rates ("BER") for systems and/or components of interest enables personnel to draw conclusions concerning the state and performance of such systems and components.

More particularly, errors that corrupt or destroy certain portions of the data pattern can occur for a variety of reasons. For example, optical signals typically experience some dispersion as they interact with optical fiber. Such dispersion degrades the signal, by lowering the signal-to-noise ratio, thereby causing errors in the signal ultimately received. As another example, various network devices on the path can also cause errors to occur within the data pattern.

As suggested earlier, aspects of such errors can be used to facilitate various diagnostic and remedial processes. For example, device failures or malfunctions on the network can be identified by examining the specific number of errors that have occurred on a particular path on the network, and the problematic network portion or device(s) can be adjusted or replaced as required. Further, the number and occurrence of such errors can also be used to identify, locate and resolve problematic connections within the network or device that is being tested.

With more particular attention now to FIG. 3, the exemplary test module 300 includes a pair of link connections 302 and 304 configured for full-duplex operation and arranged to receive, and pass, various data signals. As in the case of the monitor module 200, the link connections 302 and 304 may simply be the link connections of the traffic checker 100 (see FIG. 1) or, alternatively, may comprise link connections separate from, but in communication with, the link connections of the traffic checker 100. In yet another arrangement, link connections 302 and 304 comprise link connections 202 and 204, so that the test module and monitor module share the same link connections.

The test module 300 further includes a pattern memory 306 that stores various test patterns which may be selected and transmitted onto the network. Further details concerning the use of test patterns are provided below but, as noted above, the test pattern is transmitted by the test module 300 through a device, system, or portion thereof in order to determine what effect, if any, the device, system or portion has on the transmitted pattern.

The test patterns may be generated internally by the test module 300, or preloaded into the pattern memory 306 from an external source. Note that test patterns may also be referred to herein as a test data pattern, sequence, or test sequence. One exemplary test pattern comprises a stream of Gigabit Ethernet data frames and idle characters. However, any other protocol-specific data patterns may likewise be defined and used.

The test module 300 further includes a transmitter 308 connected with the link connection 302 and including a counter 310. The test module 300 also includes a compare engine 312 which, like the transmitter 308, is arranged to communicate with the pattern memory 306. In general, the transmitter 308 is configured and arranged to transmit a data pattern, obtained from the pattern memory 306, onto a network or device in, for example, a loop arrangement where the data pattern returns to the traffic checker after passing through a defined network node. The counter 310 includes a register or other device that contains information concerning the number of bits sent by the transmitter 308.

The compare engine 312 is configured to receive the data pattern off the network or device, as well as to receive input from the pattern memory 306, namely, the pattern that was initially transmitted onto the network. More particularly, the compare engine 312 compares the initially transmitted data pattern with the received pattern to identify any differences between the two. In this way, the effect of the system or device of interest on the test pattern can be determined. Exemplarily, the compare engine 312 comprises a 'Compare' random access memory ("RAM"), but the compare engine 312 may comprise any other component(s) of comparable functionality. Note that elements of the test and/or monitor modules, such as the compare engine 312 for example, may be implemented, at least in part, through the use of field programmable gate arrays ("FPGA").

With continuing reference to FIG. 3, the compare engine 312 is configured to transmit error information, obtained by comparing the transmitted and received test patterns, to an error calculator 314, which is implemented as a BER calculator in some embodiments of the test module 300. The error calculator 314, in turn, provides input to a log 316 and is also arranged for communication with a display 318, which may or may not be shared with the monitor module of the traffic checker. Thus, once the BER, or other error indicator, is derived by the error calculator 314 or other error calculator, the error indicator can then be displayed.

Additionally, the error calculator 314 communicates error information to the log 316. This error information is correlated with information received at the log 316 from a timestamp submodule 320, and the correlated information can then be uploaded to a remote device 322 by way of a suitable comm port 324.

Thus, the time(s) at which one or more errors occurred, as well as the sequence of occurrence of the errors, can be readily determined by reviewing the logged error information and corresponding timestamps. As in the case of error check information obtained by the monitor module, the error information produced by the error calculator 314, along with corresponding real time, or time of day, timestamp information, that is downloaded to the log 316 may be used for further analysis and/or as an aid in identifying and implementing appropriate remedial actions concerning the system or device under test. As noted earlier, such information is particularly useful in identifying and describing causal relationships between particular events, eliminating one or more particular events as a cause of another event, or events, and identifying a particular part of a system, or a component or device as a cause of errors.

III. Exemplary Test/Monitor Setups

Figure 4B:
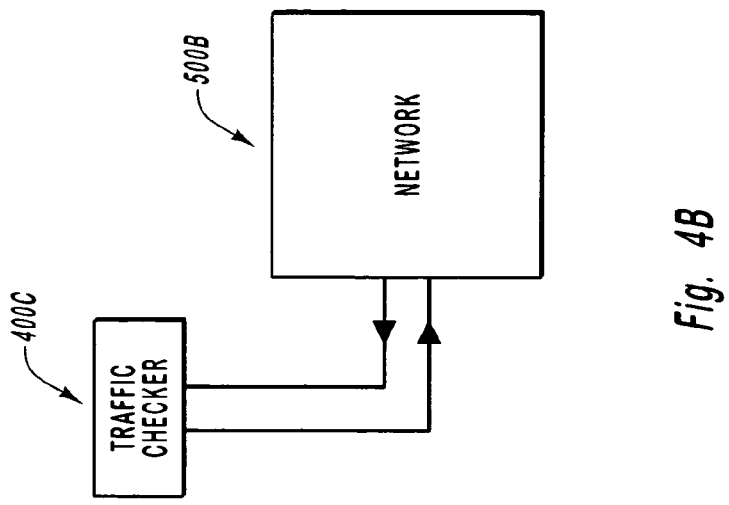
FIG. 4B is a schematic of a test setup where a single traffic checker is employed in a loopback arrangement.
Figure 4A:
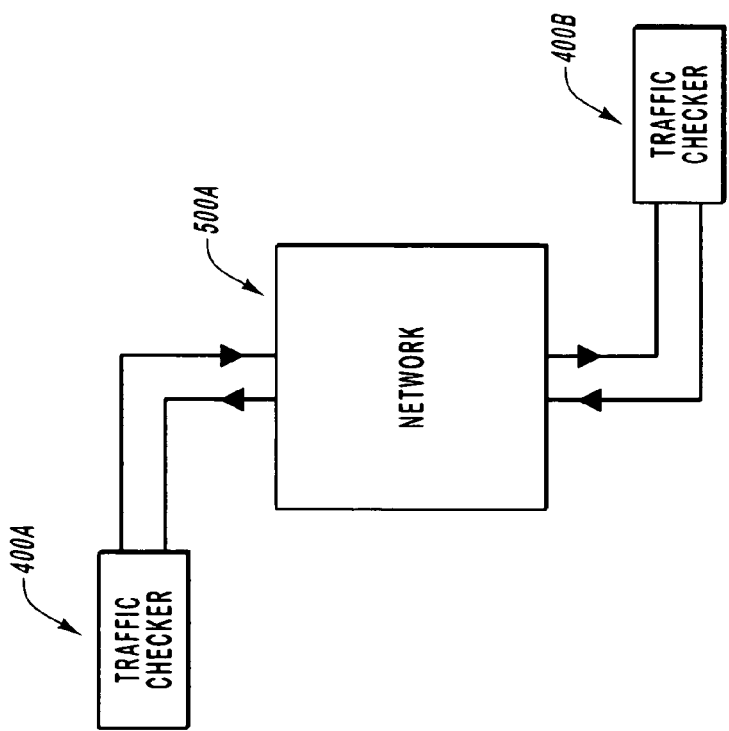
FIG. 4A is a schematic of a test set up where a pair of traffic checkers are employed in a head-to-head arrangement.

It was noted earlier that embodiments of the traffic checker can be usefully employed in a variety of different arrangements, depending upon the nature and configuration of the systems and/or devices to be tested and/or monitored, and the type of testing or monitoring that is desired to be performed. Accordingly, attention is directed now to FIGS. 4A and 4B where two different exemplary test/monitor setups are illustrated. However, arrangements of one or more traffic checkers, other than the arrangements illustrated in FIGS. 4A and 4B are possible as well. More generally, the number and arrangement of traffic checkers may be varied as necessary to suit a particular situation In order to facilitate discussion of the aforementioned setups, some information will be provided immediately following concerning the operation of exemplary traffic checkers. However, a more detailed discussion of such operations is reserved for FIGS. 5A and 5B, below.

With particular attention first to FIG. 4A, an arrangement is indicated where a pair of traffic checkers, denoted at 400A and 400B, respectively, are connected to a network, or portion thereof, denoted at 500. When this arrangement is used for testing for example, each traffic checker 400A and 400B generates and transmits a test pattern, and each traffic checker 400A and 400B receives and evaluates the test pattern transmitted by the other traffic checker after the test pattern has passed through the device or system under test, the network 500 in this case. The arrangement illustrated in FIG. 4A is sometimes referred to as a head-to-head arrangement or head-to-head configuration.

The arrangement illustrated in FIG. 4A can also be used in performing monitoring processes. In such an arrangement, the traffic checkers 400A and 400B do not communicate with each other, as in the head-to-head test mode, but instead monitor different respective portions of the network 500A. Specifically, each traffic checker 400A and 400B is disposed in a tap arrangement, where the traffic checkers 400A and 400B receive a duplicate of a data signal associated with the network 500A. In the tap configuration, an optical splitter is placed in-line with the network 500A data path so that the traffic checker 400A and 400B receives the same data stream as is passed through the network. Consequently, the traffic checker functionality can be implemented without posing any threat to the integrity of the network 500A data. For example, even if the traffic checker 400A and/or 400B, arranged in a tap configuration, were to fail, the network 500A data would not be compromised in any way.

While the arrangement illustrated in FIG. 4A is well suited for certain situations, other situations may arise that require a different arrangement. Directing attention now to FIG. 4B, an arrangement is indicated where a single traffic checker 400C is connected to a network, or portion thereof, denoted at 500B. In this arrangement, sometimes referred to as a loop or tap configuration, a single traffic checker 400C operates in a test mode by generating, transmitting, and then receiving, a test pattern over a loop defined by the traffic checker 400C and a network 500B node, or nodes, of interest. The returned test pattern can then be evaluated and an error rate determined.

As noted above, the arrangements indicated in FIGS. 4A and 4B are exemplary only and are not intended to limit the scope of the invention in any way. More generally, one or more traffic checkers can be employed in a variety of different arrangements to perform one or more testing and/or monitoring processes. In one exemplary alternative embodiment, a traffic checker is employed as an in-line device, or node of the network, so that the network data stream passes through the traffic checker.

IV. Operational Aspects of an Exemplary Traffic Checker

Figures 5A, 5B:
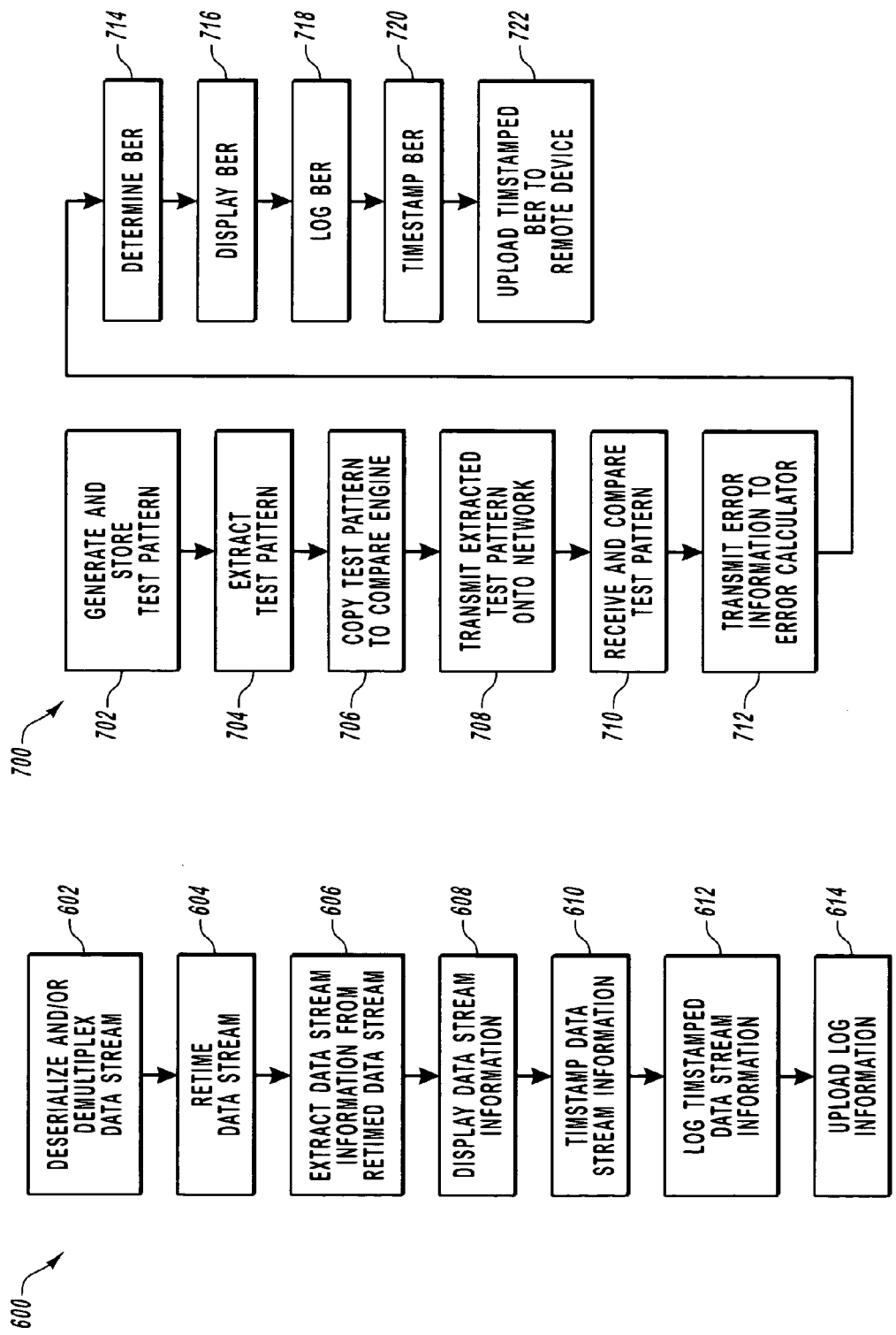
FIG. 5A is a flow diagram illustrating aspects of exemplary monitoring processes such as may be implemented by an exemplary traffic checker.
FIG. 5B is a flow diagram illustrating aspects of an exemplary testing process such as may be implemented by an exemplary traffic checker.

Directing attention now to FIGS. 5A and 5B, details are provided concerning exemplary operations and processes performed by a traffic checker and, particularly, by the test module and/or the monitor module. It should be noted that the illustrated processes are exemplary only and are not intended to limit the scope of the invention in any way.

Referring first to FIG. 5A, aspects of an exemplary monitoring process 600 are illustrated. The process 600 commences at stage 602 where an incoming data stream is deserialized and/or demultiplexed so as to facilitate monitoring and analysis. In the case where the traffic checker is used in a tap configuration, for example, the incoming data stream is a duplicate of a network data stream that is to be monitored and analyzed. After demultiplexing and/or deserialization, the process 600 advances to stage 604 where the data stream is then retimed by the monitor module.

At stage 606, data stream information, such as error, data rate, and frame size information for example, is extracted, derived or otherwise obtained from the retimed data stream. Some or all of the extracted information is then displayed at stage 608 of the process 600.

The process 600 then advances to stage 610 where some or all of the extracted data stream information is timestamped so that particular pieces of information are correlated with a particular time value, relative to a reference clock or other mechanism of comparable functionality. The timestamped information is then logged at stage 612. In exemplary implementations of the process 600, logging of the timestamped information involves, among other things, generating a log file, or modifying an existing log file, either of which may include information such as, but not limited to, time/date of the start of the monitoring evolution, protocol and clock rate of the monitoring evolution, ID of the traffic checker performing the monitoring, the extracted data stream information, time/date of the end of the monitoring evolution and the time/date of the occurrence of one or more errors or other conditions identified in connection with the monitoring process. Note that the timestamping and/or logging may, like other elements of the process 600, be performed substantially in real time, or on some alternative basis.

Finally, exemplary embodiments of the process 600 include a further stage 614 where the logged information is uploaded to an external system or device. In this way, information gathered as a result of the monitoring process 600 can be further processed and analyzed. Any necessary corrective actions indicated by such analysis can then be implemented and monitoring may recommence in order to ascertain the effect(s), if any, resulting from the implementation of such corrective actions.

It should be noted with respect to the exemplary process 600 that while the various stages that make up the process are illustrated in a particular order in FIG. 5A, the scope of the invention is not so limited and the order in which the stages are implemented varies from one monitoring evolution to another. By way of example, some monitoring processes may not display any information. As another example, some monitoring processes may perform timestamping and logging prior to any display of information, rather than subsequently, as illustrated in FIG. 5A. Thus, the scope of the invention should not be construed to be limited to the exemplary illustrated monitoring process. Moreover, exemplary monitoring processes may include more, or fewer, stages.

As disclosed elsewhere herein, exemplary embodiments of the traffic checker are able to perform various testing processes, as well as monitoring processes such as exemplified in FIG. 5A. Accordingly, attention is directed now to FIG. 5B where aspects of an exemplary testing process 700 are illustrated.

The process 700 commences at stage 702 where a test pattern is generated by the traffic checker and stored in the pattern memory. In other cases, the test pattern has already been preloaded into the pattern memory. In any event, the test pattern is extracted from the pattern memory by the transmitter at stage 704, and copied to the compare engine at stage 706. In other implementations, the copying of the test pattern occurs at about the same time, or prior to, extraction of the test pattern.

In any event, the process 700 then advances to stage 708 where the extracted test pattern is then transmitted onto the network. At stage 710, the test pattern is then received back at the compare engine where the 'Compare' RAM compares the test pattern received of the network with the test pattern as received initially from the pattern memory. This comparison process aids in the generation of a BER or other error indicator.

In particular, at stage 712 of the process 700, the compare engine identifies the number and type of errors present in the received test pattern and transmits that information to the error calculator. The process 700 then advances to stage 714 where the error calculator determines, for example, a BER associated with the received test pattern. The BER is defined as 1+the number of bit errors divided by the number of 0 bits sent by the transmitter.

At stage 716, the BER thus derived is visually displayed. Further, the BER is output, at stage 718, from the BER calculator to the log in connection with receipt, at the log, of timestamp information corresponding to the BER. The timestamp and BER data are correlated at stage 720 and then uploaded at stage 722 to a remote device for further analysis and/or as an aid in identifying and implementing appropriate remedial actions concerning the system or device under test.

It should be noted that real time 'time of day' timestamp and logging is also implemented in connection with exemplary error rate testing processes such as are contemplated by the embodiment illustrated in FIG. 5B. For example, a log file may be generated for each test wherein the log file is exemplarily configured to include: time/date of the start of the testing evolution; protocol and clock rate of the testing evolution; ID of the traffic checker running the test; test results; time/date of the end of the testing evolution; and, time/date of the occurrence of one or more errors.

Finally, some exemplary testing, or monitoring, processes also provide for measuring the latency of a particular system, system portion, or device. Generally, this involves determining a raw latency value and then deducting an offset value, representing the amount of time required for a frame to transit the traffic checker and other hardware not part of the system under test, from the raw latency value to determine the actual latency of the system or device under test.

V. General Aspects of Software

As disclosed elsewhere herein, aspects of implementations of the invention may be implemented by way of a host device and associated software. With respect to the host device, a special purpose or general purpose computer may be provided that includes various computer hardware, as discussed in greater detail below.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and content which cause a general purpose computer, special purpose computer, or special purpose processing device to perform a certain function or group of functions.

The following discussion is intended to provide a brief, general description of an exemplary computing environment in which aspects of exemplary embodiments of the invention may be implemented. Although not required, aspects of the invention may be described in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of the program code means for executing steps of the methods disclosed herein. The particular sequence of such executable instructions or associated content structures represent examples of corresponding acts for implementing the functions described in such steps.

Of course, the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment for example, program modules may be located in both local and remote memory storage devices.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

What is claimed is:

1. A traffic checker suitable for use in testing and evaluating aspects of a high speed communications network, the traffic checker comprising:
   a plurality of link connections;
   a display; and
   a plurality of components configured for communication with the plurality of link connections, the plurality of components being compatible with multiple protocols and comprising:
      a monitor module, comprising:
         a retimer configured to receive and retime a data signal by way of at least one of the link connections;
         at least one monitor submodule with access to the both the data signal and the retimed data signal and configured to communicate with the display;
         a timestamp submodule; and
         a first log in communication with the at least one monitor submodule and the timestamp submodule, wherein errors identified in at least one of the retimed data signal or the data signal are filed in the first log and timestamped with the timestamp submodule; and
      a test module in communication with the display and comprising:
         a transmitter in communication with one of the link connections;
         a compare engine;
         a pattern memory in communication with the transmitter and the compare engine, wherein the transmitter transmits a particular test pattern from the pattern memory and wherein the compare engine determines an effect of the communications network on the test pattern;
         a second log;
         an error calculator in communication with the compare engine and with the second log; and
         a timestamp module in communication with the second log.

2. The traffic checker as recited in claim 1, wherein the at least one monitor submodule comprises one or more of: a frame size submodule; an error check submodule; and, a data rate submodule.

3. The traffic checker as recited in claim 1, wherein the plurality of link connections comprises at least two pairs of link connections, at least one of the pairs of link connections conforming to a different standard than another of the pairs of link connections.

4. The traffic checker as recited in claim 3, wherein at least one of the pairs comprises one of: GBIC connections; SFFP connections; and, ESCON connections.

5. The traffic checker as recited in claim 1, wherein the at least one monitor submodule is configured to operate in connection with at least the retimed data signal.

6. The traffic checker as recited in claim 1, wherein the at least one monitor submodule comprises:
a pair of frame size modules;
a pair of error check modules; and
a pair of data rate modules.

7. The traffic checker as recited in claim 1, wherein the at least one monitor submodule is configured to provide information concerning at least one of: frames of the data signal; words of the data signal; synchronization of the data signal relative to a reference clock; connection link status; and, status of the data signal.

8. The traffic checker as recited in claim 1, wherein the first log and the second log comprise the same log.

9. The traffic checker as recited in claim 1, wherein the multiple protocols with which the monitor module and test module are compatible include at least two of the following protocols: Gigabit Ethernet; 10 Gigabit Ethernet; Fibre Channel; Fiber Connector; Inter System Coupling Interface; Synchronous Optical Network; OC48; and Enterprise Systems Connection.

10. The traffic checker as recited in claim 1, wherein the first log is configured to store information obtained by the at least one monitor module and timestamped by the timestamp module.

11. The traffic checker as recited in claim 1, wherein the monitor module further comprises at least one of the following components configured to receive at least a portion of the data signal: a multiplexer; a demultiplexer; a serializer; and, a deserializer.

12. The traffic checker as recited in claim 1, wherein the error calculator comprises a BER calculator configured to calculate a bit error rate associated with a test pattern.

13. The traffic checker as recited in claim 1, wherein the compare engine comprises a 'compare' RAM.

14. The traffic checker as recited in claim 1, wherein the traffic checker is configured for use in both head-to-head setups and loop setups.

15. The traffic checker as recited in claim 1, further comprising a latency calculator configured to transmit and receive frames by way of at least one of the link connections.

16. The traffic checker as recited in claim 15, wherein the latency module is configured to communicate with at least one of the first and second logs.

17. The traffic checker as recited in claim 1, further comprising a data rate selector switch that permits user initiated selection of a data rate associated with processes performed by the traffic checker.

18. The traffic checker as recited in claim 1, further comprising a mode selector switch that permits user initiated selection of either a "monitor" mode or a "test" mode.

19. The traffic checker as recited in claim 1, further comprising an input selector switch that permits user initiated selection of a particular set of link connections to be used for communications.

20. A traffic checker suitable for use in testing and evaluating aspects of a high speed communications network, the traffic checker comprising:
a plurality of link connections;
a display; and
a plurality of components configured for communication with the plurality of link connections, the plurality of components being compatible with multiple protocols and comprising:
a monitor module, configured to perform real time testing of the network on data signals that include both untimed and retimed data signals, comprising:
a retimer configured to receive and transmit data signals by way of the link connections;
a plurality of monitor submodules with access to the data signal and configured to communicate with the display, the plurality of monitor submodules comprising:
a pair of frame size submodules;
a pair of error check submodules; and
a pair of data rate submodules; and
a first timestamp submodule; and
a first log in communication with the error check submodules and the first timestamp submodule, the first log including errors identified by the error check submodules; and
a test module in communication with the display and comprising:
a transmitter in communication with one of the link connections;
a compare engine;
a pattern memory in communication with the transmitter and the compare engine, wherein the transmitter transmits a particular test pattern from the pattern memory and wherein the compare engine determines an effect of the communications network on the test pattern;
a second log;
a BER calculator in communication with the compare engine and with the second log; and
a second timestamp module in communication with the second log.

21. The traffic checker as recited in claim 20, wherein the traffic checker comprises a portable device suitable for field use.

22. The traffic checker as recited in claim 20, wherein the plurality of link connections comprises:
a pair of GBIC link connections; and
a pair of SFFP link connections.

23. The traffic checker as recited in claim 20, wherein at least one of the monitor submodules is configured to operate in connection with a retimed data signal.

24. The traffic checker as recited in claim 20, wherein the monitor module is configured to obtain information concerning at least one of: frames of a data signal; words of a data signal; synchronization of a data signal relative to a reference clock; connection link status; and, status of a data signal.

25. The traffic checker as recited in claim 20, wherein the multiple protocols with which the monitor module and test module are compatible include at least two of the following protocols: Gigabit Ethernet; 10 Gigabit Ethernet; Fibre Channel; Fiber Connector; Inter System Coupling Interface; Synchronous Optical Network; OC48; and Enterprise Systems Connection.

26. The traffic checker as recited in claim 20, wherein the first log is configured to store information obtained by the error check submodules and timestamped by the first timestamp module.

27. The traffic checker as recited in claim 20, wherein the monitor module further comprises at least one of the following components configured to receive at least a portion of a data signal: a multiplexer; a demultiplexer; a serializer; and, a deserializer.

28. The traffic checker as recited in claim 20, wherein the compare engine comprises a 'compare' RAM.

29. The traffic checker as recited in claim 20, wherein the traffic checker is configured for use in both head-to-head setups and loop setups.

30. The traffic checker as recited in claim 20, further comprising a latency calculator configured to transmit and receive frames by way of at least one of the link connections.

31. The traffic checker as recited in claim 30, wherein the latency module is configured to communicate with at least one of the first and second logs.

32. The traffic checker as recited in claim 20, further comprising a data rate selector switch that permits user initiated selection of a data rate associated with processes performed by the traffic checker.

33. The traffic checker as recited in claim 20, further comprising a mode selector switch that permits user initiated selection of either a "monitor" mode or a "test" mode.

34. The traffic checker as recited in claim 20, further comprising an input selector switch that permits user initiated selection of a particular set of link connections to be used for communications.

* * * * *